United States Patent [19]

Burgess

[11] 3,894,508
[45] July 15, 1975

[54] SUGARING MACHINE FOR BAKERY PRODUCTS

[75] Inventor: Ralph D. Burgess, Minneapolis, Minn.

[73] Assignee: The Pillsbury Company, Minneapolis, Minn.

[22] Filed: May 21, 1973

[21] Appl. No.: 362,035

[52] U.S. Cl. .................. 118/19; 118/22; 118/23; 99/494; 99/644; 198/220 BA; 198/220 CA
[51] Int. Cl. .............................................. A23g 3/00
[58] Field of Search .......... 99/494, 644; 118/16, 22, 118/24, 25, 303, 19; 198/220 BA, 220 CA, 220 DA; 209/331, 333, 337

[56] References Cited
UNITED STATES PATENTS

| | | | |
|---|---|---|---|
| 2,705,070 | 3/1955 | Carrier | 198/220 CA |
| 2,821,985 | 2/1958 | Bretz | 209/337 |
| 2,893,332 | 7/1959 | Roser | 118/24 |
| 3,472,431 | 10/1969 | Bodine | 198/220 DA |

Primary Examiner—Harvey C. Hornsby
Attorney, Agent, or Firm—James V. Harmon; Michael D. Ellwein

[57] ABSTRACT

A pair of inclined parallel stepped coating chutes receive bakery products as well as a coating material, e.g. sugar, at their upper ends. The chutes are mounted for coaxial reciprocation on a horizontal line normal to the axis of each and both are connected to a driving means for reciprocating the chutes along this line first toward one another and then in opposite directions to thereby cancel vibrations. As the chutes reciprocate during operation, the product being coated is inverted at each step as it descends the chute and is simultaneously covered with the coating material.

4 Claims, 3 Drawing Figures

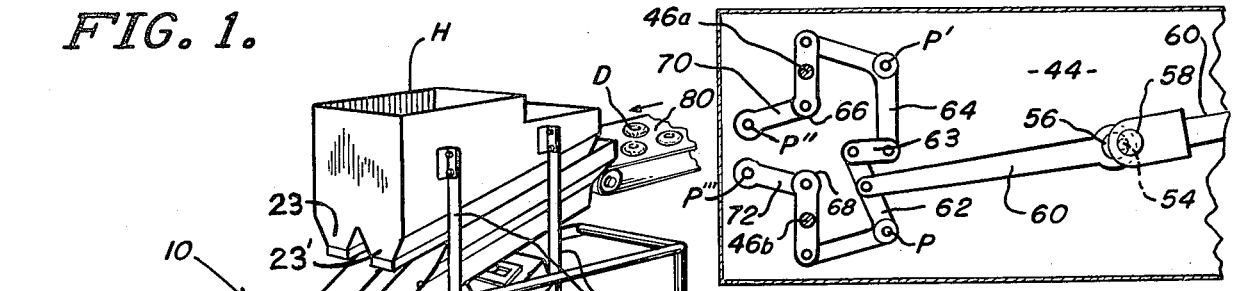
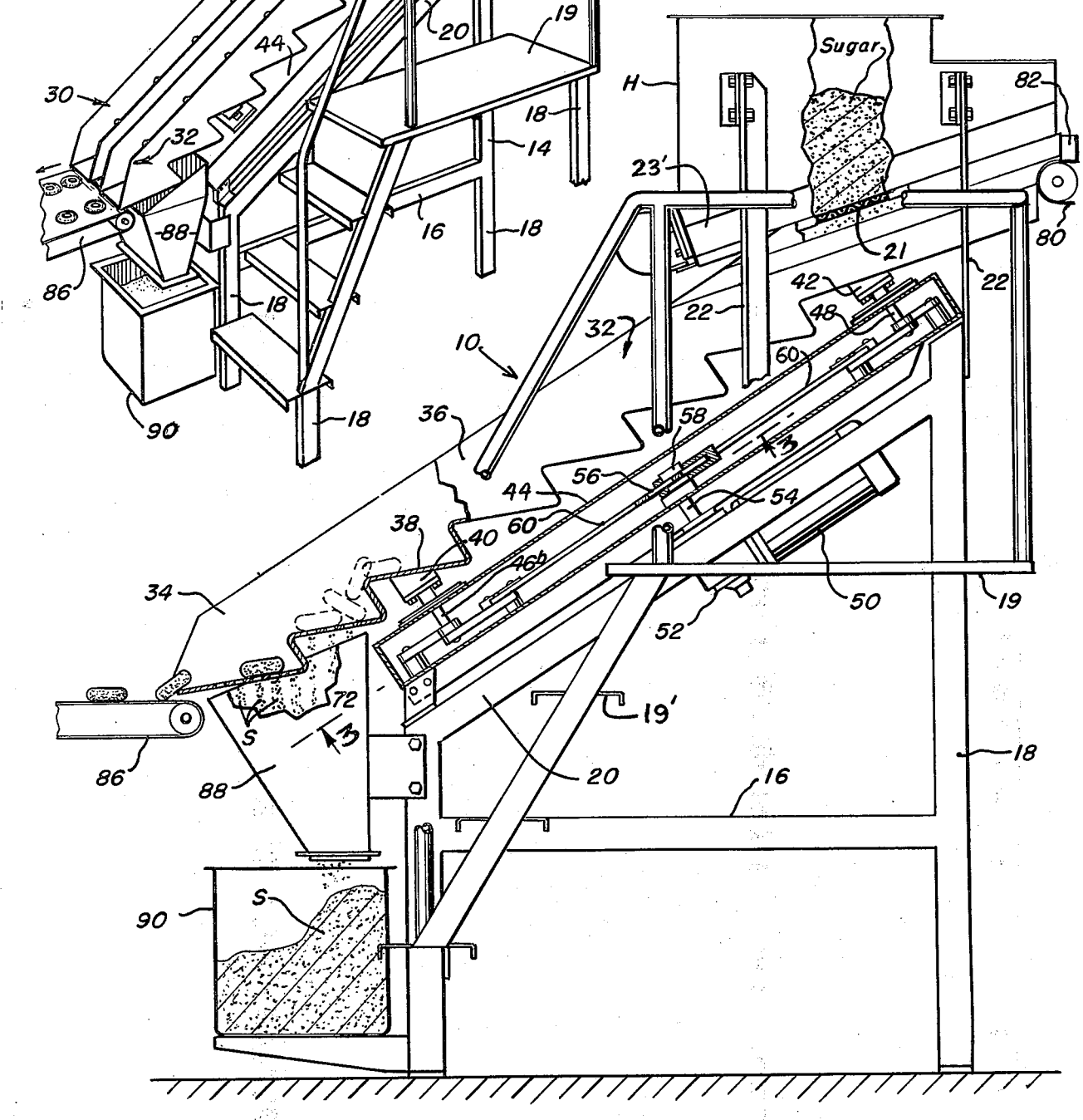

3,894,508

SUGARING MACHINE FOR BAKERY PRODUCTS

FIELD OF THE INVENTION

The present invention relates to bakery equipment and more particularly to a bakery product coater which is especially useful for coating fried products, donuts, longjohns, bismarks and the like.

THE PRIOR ART

Drum coaters of various kinds are at the present time the most widely used and almost universally accepted apparatus for applying coatings such as powdered sugar, granular sugar, cocoanut etc. to bakery products. These coaters consist of one or more horizontally disposed rotating drums which repeatedly elevate the donuts and sugar as they pass through the drum and then allow them to fall periodically, thereby coating the surfaces of the product before they emerge from the drum. In some cases a belt conveyor is used to introduce the products to the drum. Coaters of this kind are satisfactory for many purposes but sometimes treat the products roughly. This sometimes leaves the products damaged or the coating sugar applied unevenly.

OBJECTS OF THE INVENTION

The primary objects of the present invention are to provide (a) an improved coating apparatus for bakery products which will apply an even layer of coating material and will treat the products being coated in a gentle manner, (b) will provide vibrationless operation, (c) will invert the products repeatedly throughout operation to uniformly coat both sides, (d) will include a provision for introducing coating material and for removing excess coating, (e) will operate reliably and will be rugged in construction, (f) and can be applied to a variety of bakery products and bakery product coatings.

THE FIGURES

FIG. 1 is a perspective view of an apparatus embodying the invention.

FIG. 2 is an elevation view partly in section of the apparatus of FIG. 1 on an enlarged scale and FIG. 3 is a partial, sectional view taken on Line 3—3 of FIG. 2.

SUMMARY OF THE INVENTION

The invention provides at least one inclined stepped coating chute adapted to receive bakery products at its upper end together with coating material which is to be applied to the surface of the bakery products. The chute is mounted for reciprocation along a horizontal line normal to the axis of the chute, that is to say, laterally or from side-to-side with relation to the general path of travel taken by the bakery products as they proceed from the inlet end of the chute at the top to the outlet end of the chute at the bottom. In a preferred form of the invention, the stair steps and risers are of such a height and inclination that each bakery product will be inverted as it descends from one step to the next and thereby turned over and over on the way down.

In one preferred form of the invention, a pair of such chutes are provided in side-by-side relationship and a drive mechanism is provided to reciprocate the chutes in synchronization at equal speeds and in the opposite directions so that vibrations are cancelled.

DESCRIPTION OF THE PREFERRED EMBODIMENT

As seen in the figures, the apparatus indicated generally at 10 includes a pair of spaced apart, inclined and generally parallel coating chutes 30, 32 each provided with an internal stair step arrangement to be described in detail below. The apparatus is supported by a framework 14 composed of beams 16 and vertical columns 18 joined as by welding. A part of the framework is gained by stairs 19'. The coating chutes 30 and 32 are supported upon an incline beam 20. A coating hopper H is supported on vertically disposed columns 22 immediately above the upper end of coating chutes 30 and 32 and is adapted to contain a coating material such as sugar (FIG. 2) which is supported within the hopper (for example by a screen 21) and distributed to each of the chutes by the provision of two laterally spaced openings 23 and 23' each located immediately above one of the respective coating chutes.

Each of the chutes 30 and 32 includes two parallel, vertically disposed side panels 34 and 36 (FIG. 2) and a floor 38 which is shaped like a stair step in which the tread of each step is inclined slightly at an angle of about 20°–30° from the horizontal. Since the chutes are identical, only one will be described in detail. As can be seen, each step includes a substantially vertical wall. It is preferred that the horizontal part of each step (the tread) be inclined downwardly slightly toward the outlet end of the chute. It is also preferred that the vertical part of each step (the riser) be inclined rearwardly i.e. so that a recess is formed beneath the edge of each step to allow the initial rotational motion as the product passes over the edge of the step to continue without restriction until it comes to rest upside down on the next succeeding step. The angle is in this instance about 40° to the vertical.

Both the chutes 30 and 34 are mounted upon longitudinally spaced support blocks 40 and 42, only two of which are shown. These blocks are in turn secured to the upper ends of posts 46b and 48 that extend upwardly through suitable openings in a drive housing 44 which encloses a drive apparatus for reciprocating the chutes. While the drive per se is not critical to the present invention, the particular drive arrangement to be described is highly effective and will function reliably over extended periods of time. The mounting of one chute will be described in detail by reference to FIGS. 2 and 3.

An electric drive motor 50 is connected to right angle drive 52 having an output shaft 54 to a pair of eccentrics 56 and 58 each of which is connected to a connecting rod 60. Only the connecting rod 60 which extends downwardly will be described in detail since both are identical and both are connected to identical reciprocating levers and linkages at the top and bottom of the housing 44.

As seen best in FIG. 3, the lower connecting rod 70 is pivoted to one end of a V-shaped lever 62 the center of which is pivoted at point P to the housing 44. The central end of lever 62 is connected via link 63 to one end of a V-shaped lever 64 pivoted at its center at point P' to the housing 44. The other ends of the levers 62 and 64 are connected respectively to links 66 and 68 which are in turn pivoted to the ends of links 70 and 72. The opposite ends of these links are in turn pivoted at P'' and P''' to the housing 44. Oscillation imparting rods 46a and 46b are connected to the corresponding lower mounting blocks 38 of the chute 30 and 32 respectively and at the upper ends of the chutes the blocks 42 (only the one for chute 32 being shown) are connected by rods 48 (FIG. 2). It can be seen that as the eccentrics 56, 58 move in opposite directions, the connecting rods 60 will be forced outwardly from shaft 54 and will cause the levers 62 and 64 to rotate on the pivots P and P' in the appropriate direction to force the rods 46a, 46b and the corresponding ends of the chutes 30 and 32 away from one another. The reciprocation imparting links at the upper end of the housing 44 moves the upper ends of the chutes in the same corresponding direction. Thus, during operation as shaft 54 rotates, the chutes reciprocate toward and away from one another at the same speed but in opposite directions at all times.

As seen in FIGS. 1 and 2, the bakery products such as donut D are conveyed to the inlet end of the chutes by means of an endless conveyor such as an endless belt 80 only a portion of which is shown. The bakery products are in this way transferred to the inlet ends of the chutes and any donuts that happen to be in the middle of the belt are deflected by means of a stationary guide 82 mounted upon the framework between the upper ends of the chutes to thereby insure that all of the donuts pass into one or the other of the chutes. As the donuts descend along with the coating such as sugar, which flows continuously through the screen 21 from hopper H, they travel downwardly and are inverted at each stair step as shown by dotted lines at the lower end of FIG. 2. Any excess coating material is allowed to pass through openings in the last two steps and into a funnel 88 which feeds the excess coating into a storage container 90 as shown at S. The coated bakery products or donuts are carried by means of a takeaway conveyor 86 such as an endless belt conveyor only a portion of which is shown.

The speed of reciprocation can be varied to suit circumstances, but it has been found that a speed of about 20–200 cycles per minute will be satisfactory for most purposes.

What is claimed is:

1. A sugaring machine for bakery products comprising:
   A. a supporting framework,
   B. a pair of side-by-side inclined stepped coating chutes adapted to receive uncoated bakery products at their upper ends together with a coating substance,
   C. each chute comprising a plurality of stair steps and each step being of an appropriate height to cause each bakery product to become inverted as it falls from each step to the next succeeding lower step,
   D. the chutes each being mounted upon the supporting framework for side-to-side reciprocation on a common horizontal axis extending substantially normal to the paths of travel taken by the products as they pass from the inlet end of each chute at the top to the outlet end of each chute at the bottom,
   E. drive means operatively associated between the chutes for imparting side-to-side reciprocation to the chutes, the drive means comprising a motor and means operatively connected between the motor and the chutes for reciprocating such chutes on said horizontal axis to move each chute member as a whole along the horizontal axis at the same speed and in opposite directions to cancel vibrations,
   F. a coating supply means located above the upper end of the chutes,
   G. the lower end of the machine having openings therein of a size that will allow the coating to fall therethrough but not the bakery products and
   H. a collection means beneath the openings for receiving excess coating material whereby as the chutes reciprocate with the bakery products traveling from the top of each chute to the bottom thereof, each bakery product is coated with a layer of said coating material.

2. The apparatus of claim 1 wherein each step is inclined downwardly proceeding toward the outlet end of the chute.

3. The apparatus of claim 1 wherein the drive means is a motor connected by linkage means to the upper and lower ends of each chute to impart said reciprocation thereto.

4. The apparatus of claim 1 wherein each step includes a rearwardly extending recess below the edge of each step to allow the initial rotational motion of the product passing over the edge to continue and thereby become inverted at each step.

* * * * *